United States Patent [19]
Oguino

[11] Patent Number: 4,531,812
[45] Date of Patent: Jul. 30, 1985

[54] REAR PROJECTION SCREEN

[75] Inventor: Masanori Oguino, Yokohama, Japan

[73] Assignee: Hitachi, Ltd., Tokyo, Japan

[21] Appl. No.: 473,862

[22] Filed: Mar. 10, 1983

[30] Foreign Application Priority Data

Mar. 10, 1982 [JP] Japan ................................ 57-36379

[51] Int. Cl.³ ............................................. G03B 21/60
[52] U.S. Cl. .................................................. 350/128
[58] Field of Search ................................ 350/127, 128

[56] References Cited

U.S. PATENT DOCUMENTS 2,726,573 12/1955 Maloff ................................ 350/127
3,523,717 8/1970 Glenn, Jr. ...................... 350/128 X Primary Examiner—Richard A. Wintercorn
Attorney, Agent, or Firm—Antonelli, Terry & Wands

[57] ABSTRACT

A rear projection screen adapted for a rear projection type television receiver comprises a combined Fresnel and lenticular surface which exhibits both Fresnel lens action for macro-converging divergent input light rays and lenticular lens action for micro-diverging the input light rays.

10 Claims, 19 Drawing Figures

REAR PROJECTION SCREEN

BACKGROUND OF THE INVENTION

The present invention relates to a rear projection screen suited for use in a rear projection type television receiver.

Figure 1:
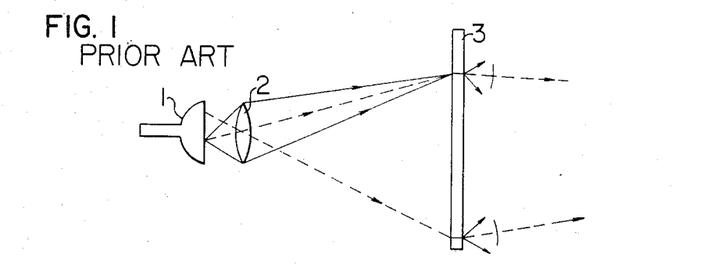
FIG. 1 is a view schematically showing a basic structure of a projection optical system for a rear projection type television receiver.

A basic arrangement of an optical system for a rear projection type television receiver or TV is shown in FIG. 1 of the accompanying drawings, in which a reference numeral 1 denotes a projecting cathode ray tube or CRT, 2 denotes a projecting lens, and 3 denotes a projection screen having a diagonal length of about 1 m to 1.5 m onto which an image produced by the CRT is projected.

As is well known, the screen of this type must exhibit a so-called macro-converging action and a micro-diverging action. The term "macro-converging action" refers to an action of the screen that causes rays of light incident on peripheral portions of the screen, spreading divergently from the CRT, to converge toward the central directions, as indicated by broken lines in FIG. 1 whereby an image of a uniform brightness can be seen on the screen over the whole area including the peripheral portion. To attain the macro-converging action, a Fresnel lens is used.

On the other hand, the term "micro-diverging action" means an action when rays of light output from the screen are diverged at a large solid angle so that the image on the screen can be perceived at a uniform brightness even when the image is viewed in a direction inclined relative to the plane of the screen. A lenticular lens is used for attaining the micro-diverging action or function.

Figure 2:
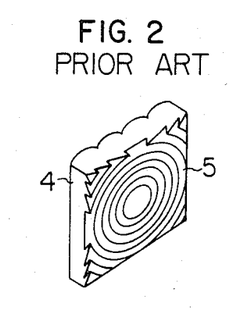
FIG. 2 is a perspective view of a hitherto known projection screen.

Heretofore, there have been proposed various types of screens which can be used as the projection screen 3, a typical one of which is shown in FIG. 2 of the accompanying drawings. In this figure, the reference numeral 4 denotes a lenticular lens surface in which there are formed a number of vertical stripes of such configuration that the rays of light are diverged in the horizontal direction. A numeral 5 denotes a linear Fresnel lens surface constructed with a number of coaxial circular stripes or setbacks each of a sawtooth-like cross-section.

It will be noted that, in the hitherto known screen, the lenticular lens surface and the Fresnel lens surface are formed separately from each other. Accordingly, even a small difference or error in the pitch of the stripe array or even a slight mismatch in the phase relation of the stripe array between both the lens surfaces would give rise to the appearance of interference fringes (moiré interference) which degrade the image quality.

In an attempt to reduce the moire interference, it is known to admit particles of glass, silicon oxides or the like into the material (usually, plastic resin such as acryl or the like) of the screen for the purpose of diffusing rays of light in the medium. However, this measure is inevitably accompanied with the side or secondary effect of the degradation of the transmissivity of light which deteriorates the clearness of the projected image.

Next, examination will be made on the efficiency of light transmission of the projection screen. Assuming now that a light of 1 lumen is incident on a unit area of the screen (i.e. assuming that the input intensity of illumination or illuminance is 1 lux), the efficiency of light transmission is represented by T, and luminance of the output light is represented by $B(x, y)$ lumen/m² str, where x represents a longitudinal coordinate in radian with y representing a latitudinal coordinate also in radian on the assumption that the output surface of the screen is positioned at the center of a virtual sphere.

Figure 3:
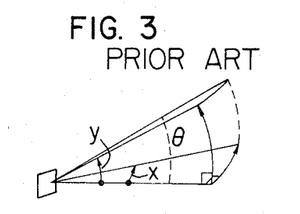
FIG. 3 is a view illustrating a polar coordinate system.

The polar coordinate system in concern is illustrated in FIG. 3. In this coordinate system, the following relation for the effeciency of light transmission T applies valid in view of the law of conservation of energy. That is, $$T = \int\int B(x,y) \cos\theta \, d\Omega \qquad (1)$$

where $\theta$ represents a composite angle of x and y, and $\cos\theta$ represents what is referred to as the Lambertian coefficient. According to the spherical geometry, the Lambertian coefficient $\cos\theta$ is given by $$\cos\theta = \cos x \cdot \cos y \qquad (2)$$

Further $d\Omega$ represents a prime element of the solid angle which is given by the following expression (3) in accordance with the spherical geometry.

$$d\Omega = \cos y \, dx \, dy \qquad (3)$$

With the expressions (2) and (3) taken into account, the expression (1) can be rewritten as follows:

$$T = \int\int B(x,y) \cos x \cos^2 y \, dx \, dy \qquad (4)$$

$$= \int\int B(x,y) \, d(\sin x) \cdot \left( d\frac{y}{2} + d\frac{\sin 2y}{4} \right)$$

Figure 4:
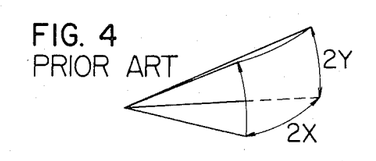
FIG. 4 is a view for illustrating exemplarily a directivity characteristic of a screen.

For simplification of description, it is assumed that $B(x, y)$ is a constant $B_O$ which is independent of x and y in ranges between $\pm X$ (constant of x and $\pm Y$ (constant) of y, respectively, and the $B(x, y)$ is zero when $|x| > X$ and $|y| > Y$, as is shown in FIG. 4. In other words, it is assumed that the screen can be observed at a uniform brightness $B_O$ only in the range where $|x| \leq X$ and $|y| \leq Y$.

On the above conditions, the expression (4) can be developed as follows:

$$T = 2B_0 (\sin x)\left( Y + \frac{\sin 2Y}{2} \right) \qquad (5)$$

Assuming, by way of example, that the screen exhibits a perfect scattering or diffusion without any loss (i.e. T=1), then $X = \pi/2$ and $Y = \pi/2$. Thus, from the expression (5), $$1 = 2B_0 \left( \frac{\pi}{2} + 0 \right)$$

$$B_0 = \frac{1}{\pi} \text{ (lumen/m}^2 \text{ str)}$$

This is a well known property of the perfectly scattering surface corresponding to an illuminance of 1 lux and supports the validity of the expression (5).

In this connection, it is important to note that examination or evaluation of a typical screen of the hitherto known structure in the light of the expression (5) has resulted as follows:

$B(0, 0) \simeq 3.0$ $X \simeq 0.3$ $Y \simeq 0.1$

Figure 5:
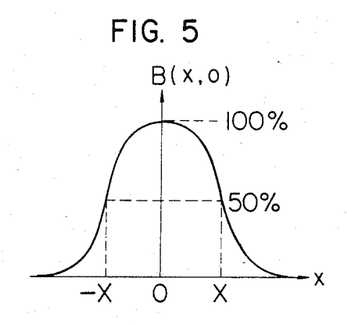
FIG. 5 is a view for graphically illustrating an example of the directivity characteristic of the screen.

In the experiment from which the above data resulted, half-value angles were used as the effective angles of divergence X and Y, as illustrated in FIG. 5.

The efficiency of light transmission T determined on the basis of the above-mentioned data in accordance with the expression (5) is ca. 0.35. In other words, it has surprisingly been found that only about 35% of the light is effectively used, being accompanied with a loss of light which amounts to as great as about 65% in the projection screen of the prior art.

In general, about 4 to 6% of the light is usually lost due to reflection at the interface between the air and the screen made of acryl resin, which means that the total light loss involved at the rear and the front surfaces of the screen is about 10%. Accordingly, a major part of the remaining light loss (about 55%) is ascribable to the side or secondary effect of the agents diffused in the screen material for dealing with the moiré interference as described hereinbefore.

As will be appreciated from the foregoing examination, the hitherto known projection screen is very susceptible to the moiré interference, which, disadvantageously can not be eliminated without a surprisingly great loss of light.

SUMMARY OF THE INVENTION

It is an object of the present invention to provide a screen which is substantially immune to the moiré interference and which is capable of producing an image of highly improved contrast by reducing the loss of light during transmission of light through the screen.

It is another object of the present invention to provide a projection screen of such configuration that it can be inexpensively manufactured in a facilitated manner.

According to an aspect of the invention, there is provided a projection screen having a lens which is formed in one and the same surface and serves for both the macro-converging action and the micro-diverging action.

DESCRIPTION OF THE PREFERRED EMBODIMENTS

Figure 6:
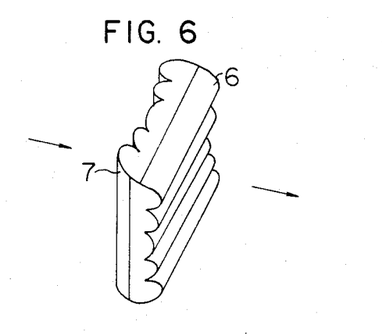
FIG. 6 shows in a perspective view a projection screen according to a first embodiment of the present invention.

The present invention will now be described in conjunction with exemplary embodiments thereof illustrated in the drawings. FIG. 6 show a screen according to a first embodiment of the invention. In this figure, a reference numeral 6 denotes a combined Fresnel and lenticular lens surface composed of a number of horizontal narrow stripes and serving for both the macro-converging and the micro-diverging of light in the vertical direction. A numeral 7 denotes another combined Fresnel and lenticular lens surface constituted by a number of vertical narrow stripes and serving for both the macro-converging and the micro-diverging of light in the horizontal direction.

Although only five stripes are shown in each of the lens surfaces 6 and 7 in the figure, this is only for the sake of simplification of illustration. In practice, each lens surface is composed of about 1000 narrow stripes in case of the screen of a size of 100 cm × 75 cm. The same holds true in other similar figures.

Description will first be made on the configuration of the combined Fresnel and lenticular lens surface 7.

Figure 7:
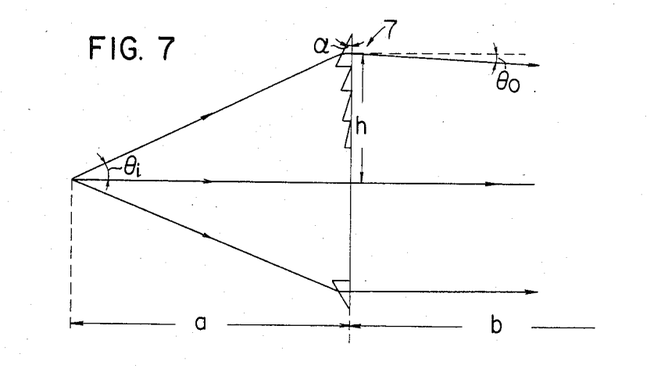
FIG. 7 is a view for illustrating a method to fix angles of inclination of components constituting a Fresnel surface according to the invention.

When the angle of the macro-divergence at the input side of the screen is represented by $\theta_i$ with the angle of the macro-convergence at the output side being represented by $\theta_o$ as shown in FIG. 7, angle $\alpha$ of inclination of a Fresnel element (prism) is determined as a function of h in accordance with the following expression:

$$\tan \alpha = \frac{n \sin \theta_2 + \sin \theta_i}{n \cos \theta_2 - \cos \theta_i} \quad (6)$$

where
$\sin \theta_2 = (1/n) \sin \theta_o$
n = refractive index of lens material (ca. 1.5),
$\tan \theta_i = h/a$,
$\tan \theta_o = h/b$, a, b: conjugate points of Fresnel lens
(a≈1.4 m, b≈5 m), and a: distance between a projecting lens and the screen.

Figures 8, 9, 10:
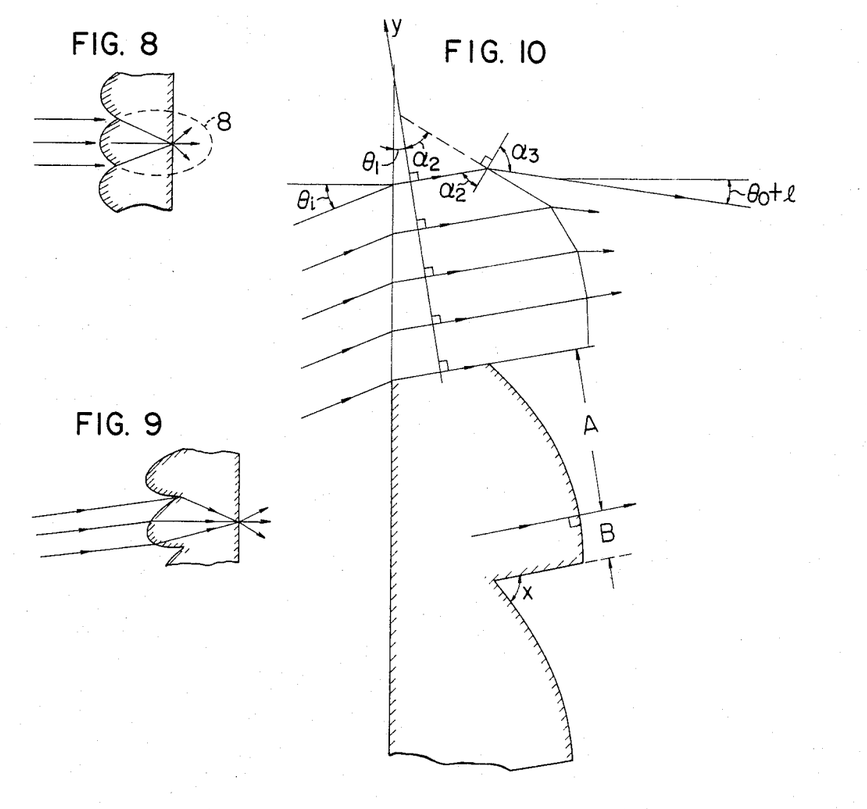
FIG. 8 shows in a sectional view an example of configuration of components constituting a lenticular surface.
FIG. 9 shows in a sectional view an example of a Fresnel/lenticular surface taught by the present invention.
FIG. 10 shows in an enlarged view elementary or prime lens surfaces of the screen shown in FIG. 6.

On the other hand, a lenticular element of the combined Fresnel and lenticular lens surface 7 has an arcuate cross-sectional profile constituted by a part of an ellipse having an eccentricity equal to 1/n. This configuration of the lenticular element is preferred because rays of light incident on the elliptical surface having the eccentricity equal to the reciprocal of the refractive index are focused at the remote focal point.

By combining the angles of inclination for the Fresnel elements and the micro-curved surfaces for the lenticular elements, the combined Fresnel and lenticular lens surface 7 can be realized. An example of the lens surface thus realized is shown in FIG. 9.

A procedure for designing the configuration of combined Fresnel and lenticular lens surfaces 6 and 7 shown in FIG. 6 will now be elucidated. FIG. 10 shows three elementary lens surfaces broken away from the combined or composite lens surface 6 shown in FIG. 6, in which the angle of the macro-divergence of light incident on a unit surface area is represented by $\theta_i$. According to Snell's law, the following expression (7) applies at the boundary of the input side.

$$\sin \theta_i = n \sin \theta_1 \quad (7)$$

where $\theta_1$ represents the angle of refraction at the exit or output side and n represents the refractive index (ca. 1.5).

The refracted light ray passes a y-coordinate perpendicularly thereto. Accordingly, what is ultimately required is to determine the angle of inclination $\alpha_2$ of the composite or combined Fresnel and lenticular lens surface. Height f of the combined Fresnel and lenticular lens surface as measured from the y-axis can be determined in accordance with the following expression.

$$df/dy = -\tan \alpha_2 \quad (8)$$

At the output boundary surface, the following expression (9) applies from Snell's law.

$$n \sin \alpha_2 = \sin \alpha_3 \quad (9)$$

Further, the following expression (10) also applies.

$$\alpha_3 = \alpha_2 + \theta_1 + \theta_o + l \quad (10)$$

From the expressions (9) and (10), $$n \sin \alpha_2 = \sin (\alpha_2 + \theta_1 + \theta_o + l) \quad (11)$$

The expression (11) can be rewritten as follows:

$$\tan \alpha_2 \{n - \cos (\theta_1 + \theta_o + l)\} = \sin (\theta_1 + \theta_o + l) \quad (12)$$

where $\theta_o$ represents the angle of macro-convergence (see FIG. 7) due to the Fresnel component and is a constant in the elementary lens surface, and l represents the angle of micro-divergence due to the lenticular component and is a variable.

In view of Lambert's law concerning luminance, the luminance B(l) of the screen observed in the direction inclined at an angle $(\theta_o + l)$ is given by $$B(l) = k \cdot \frac{dy}{d \sin (\theta_o + l)} \quad (13)$$

$$= \frac{k}{\cos (\theta_o + l)} \cdot \frac{dy}{dl}$$

Accordingly, luminance which is uniform over an angle of ±0.2 rad. in the vertical direction can be realized, provided that B(l) is constant within the angular region of ±0.2 rad. and that B(l) is equal to zero outside thereof. Further, unilateral directivity can be determined in accordance with an appropriate polynominal of l such as $B(l) \propto (1 - l^2)$ or the like. At any rate, l(y) can be determined as a function of y in accordance with the expression (13), which function in turn may be determined in terms of a polynominal or sequential data with the aid of a computer.

By placing l(y) thus determined in the expression (12), $\tan \alpha_2$ and hence df/dy can be determined as a function of l.

In this way, the configuration f(y) of the combined or composite Fresnel and lenticular lens surface can be determined.

From the foregoing, it will be understood in what manner the configuration of the lens surface 6 shown in FIG. 6 can be determined.

Figure 11:
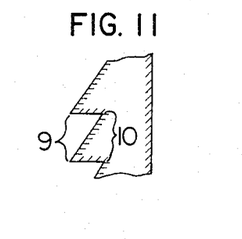
FIG. 11 is a sectional view of a Fresnel element taken along an edge portion thereof.

The screen may be inexpensively manufactured on a mass production basis by adopting an extrusion roll method. However, in order to realize the Fresnel lens, an array of sharp-edged stripes each having an apex 9 and a bottom 10 must be formed, as is shown in a cross-sectional view of FIG. 11. Heretofore, difficulty has been encountered in forming such sharp-edged stripes through the extrusion roll method. In the combined Fresnel and lenticular lens according to the first embodiment, a problem arises in connection with the realization of the sharp edges of the shape shown in FIG. 9 along the boundary between the lens elements or prisms.

The above problem is solved in the case of the projection screen having the combined Fresnel and lenticular lens surfaces according to a second embodiment of the present invention. Novel measures taken for overcoming the difficulty will be described below.

Figure 12:
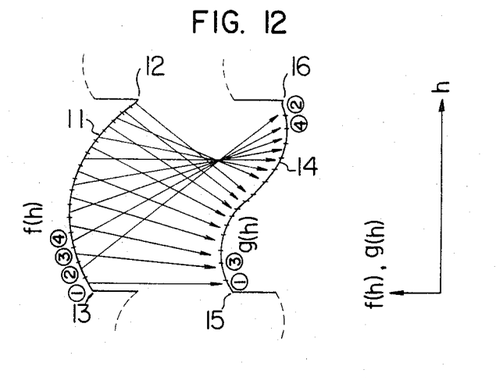
FIG. 12 is a view for illustrating a process of enlarging an angle of an edge of a Fresnel/lenticular surface according to the invention.

The concept of the measures referred to as the rearrangement angle enlarging procedure is illustrated in FIG. 12. In this figure, a lefthand curve 11 represented by f(h) corresponds to the original surface of an elementary lens constituted by the edge (having the bottom 12 and the apex 13 in the combined Fresnel and lenticular lens surface. A righthand curve 14 represented by g(h) shows the profile of the combined Fresnel and lenticular lens surface created through the inventive procedure mentioned above.

More specifically, according to the rearrangement angle enlarging procedure, the curve 11 represented by f(h) is finely divided into an even or odd number of minute sections, alternate ones of which are classified into two groups, as will be seen from FIG. 12. The minute sections belonging to one group (say, odd-numbered sections) are arranged successively from one (say, the lower) end of the curve 11, while those belonging to the other group (say even-numbered sections) are successively positioned side by side from the other (say, the upper) end of the curve 11. Then, the curve 14 represented by g(h) is obtained. The mid portion of the curve at which the minute sections belonging to the different groups, respectively, meet each other extends continuously, because these minute sections are positioned adjacent to each other in the original curve 11. The other portions of the curve 14 can be made smooth by increasing the number of the divisions. In this way, by dividing the curve into a number of minute segments and re-arranging the alternate ones in the manner described above and illustrated in FIG. 12, there can be formed a maximum angle at both discontinuous ends of the curve. Since the size and the inclination of every divided segment are conserved notwithstanding the transformation described above, the desired refraction characteristic can remain invariable according to Snell's law. The created curve 14 has the center of point symmetry at the mid portion, the prism angle of which is equal to the largest prism angle inclination at the bottom 12 of the original curve 11.

The prism angle of the created curve 14 at the apex 15 and the bottom 16 is equal to the smallest prism angle of the original curve 11. Accordingly, the angle of the edge or bottom 16 between adjacent lens elements is enlarged to a maximum value which is equal to the edge angle at the apex 13 of the original curve 11.

The curved surface of the combined Fresnel and lenticular lens produced through the re-arrangement angle enlarging procedure described above has the enlarged edge angle and thus is suited for manufacturing through the extrusion roll method on a mass production base, bringing about a great advantage from the industrial and economical viewpoint.

Figure 13:
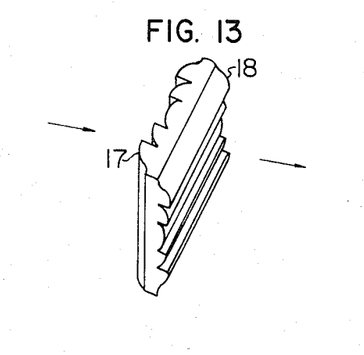
FIG. 13 shows in a perspective view a projection screen according to a second embodiment of the present invention.

FIG. 13 shows a screen according to a second embodiment of the invention which is modified in respect of the sectional profile from the screen shown in FIG. 6 through the transformation procedure described above. In FIG. 13, a reference numeral 17 denotes a combined Fresnel and lenticular lens surface imparted with the enlarged edge angle through the transformation procedure. The other combined Fresnel and lenticular lens surface 18 constituted by the horizontal stripes is also realized through application of the procedure described above. Although the number of the stripes amounts to more than 1000, only the few are shown for simplification of illustration.

As described hereinbefore in conjunction with FIG. 8, the basic sectional shape of the elementary lenticular lens located at the input side of the screen is preferably be elliptical. On the other hand, the basic sectional shape of the elementary lenticular lens provided at the exit or output side of the screen is preferably be hyperbolic. However, the present invention is never restricted to these specific configurations. It is equally possible to realize the combined Fresnel and lenticular lens surfaces according to the first and the second embodiments of the invention on the basis of stripes or elements of semi-cylindrical or other suitable curved surfaces which are commonly used in the hitherto known screen to constitute the lenticular lens surface.

Next, a procedure for designing the combined Fresnel and lenticular lens surfaces 17 and 18 of the screen according to the second embodiment of the invention will be described. For designing the combined Fresnel and lenticular lens surfaces 17 and 18, the procedure for designing the corresponding lens surfaces 6 and 7 of the screen according to the first embodiment may be applied by modifying it in consideration of the re-arrangement angle enlarging procedure illustrated in FIG. 12.

It may however be mentioned that the edge angle x at the bottom (see FIG. 10) will not be enlarged beyond 90°, since otherwise the refracted light ray would impinge on the wall of the discontinuous edge portion. This phenomenon can be evaded by applying the angle enlarging procedure only to the region indicated by A in FIG. 10 with the region B being left intact. The boundary between the regions A and B is located at the position at which a straight line normal to a tangent of the curve extends in parallel with the bottom.

Figure 14:
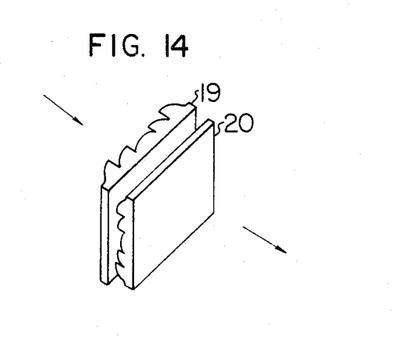
FIG. 14 shows in a perspective view a screen according to a third embodiment of the invention.

FIG. 14 shows a third embodiment of the present invention, according to which the group of horizontal stripes and the group of vertical stripes are formed separately in sheet materials 19 and 20, respectively. With this structure, the stripes can be formed, respectively, in the sheet materials 19 and 20 each in a one-dimensional pattern, which means that the manufacturing of the screen through the extrusion roll method can further be facilitated.

In FIG. 14, the combined Fresnel and lenticular lens surfaces are shown as disposed at the light incident (entry) side. It is of course possible to dispose one or both of them at the light output (exit) side.

Figure 15:
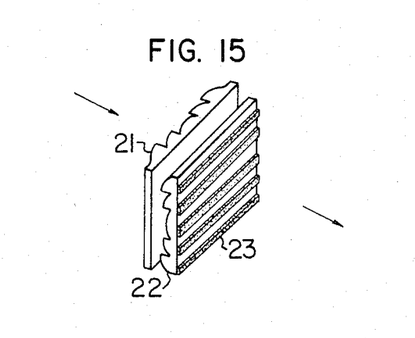
FIG. 15 shows in a perspective view a fourth embodiment of the invention.

FIG. 15 shows a fourth embodiment of the present invention. In the figure, a numeral 21 denotes a combined Fresnel and lenticular lens surface of the angle enlarged type which exhibits the same functions as those of the second or the third embodiments 17 or 19 (shown in FIGS. 13 and 14, respectively), i.e. the macro-converging and the micro-diverging of light in the horizontal direction. This lens surface 21 may also be disposed at the light output side of the screen. In FIG. 15, a reference numeral 22 denotes a combined Fresnel and lenticular lens surface which has not been subjected to the angle enlarging re-arrangement illustrated in FIG. 12 and which exhibits the macro-converging and micro-diverging actions in the vertical direction in the same manner as the lens surface 6 shown in FIG. 6. The rear surface of the lens sheet 22 which constitutes the output or front surface of the screen is provided with a number of horizontal black stripes 23 for the purpose of enhancing the contrast of the image projected on the screen by blackening the front surface thereof.

Figure 16:
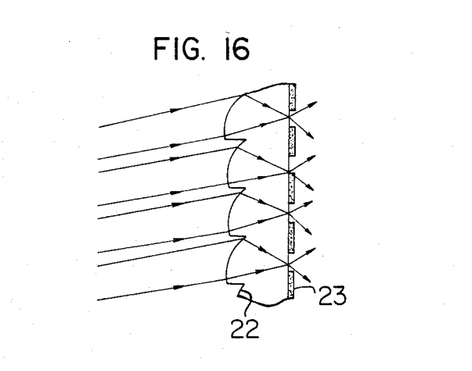
FIG. 16 is a fragmental sectional view of the screen shown in FIG. 15.

The provision as well as effect of such black stripes is known, e.g. from U.S. Pat. No. 3,830,556, which however teaches solely the combination of the black stripes with a lenticular lens surface. In contrast, the fourth embodiment is characterized in the combination of the black stripes with a composite Fresnel and lenticular lens surface, as can be seen from a fragmental enlarged sectional view shown in FIG. 16.

Figure 17:
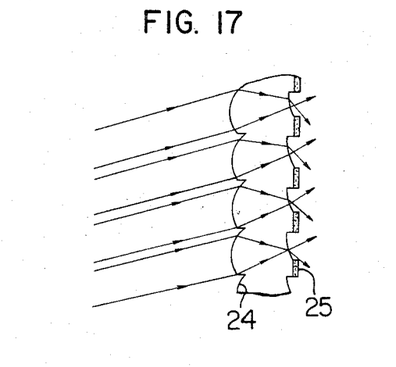
FIG. 17 is a fragmental sectional view of a screen according to a fifth embodiment of the invention.

FIG. 17 shows a main portion of a fifth embodiment of the present invention which is a modification of the structure described above with reference to FIGS. 15 and 16, and is characterized in that the inclination of the Fresnel components of a composite Fresnel and lenticular lens surface 24 is gentled, while light slit portions of the black-striped surface 25 is provided with Fresnel components (setbacks). With this structure, the front and the rear prism angles are required to realize the desired macro-converging action as a whole.

Figure 18:
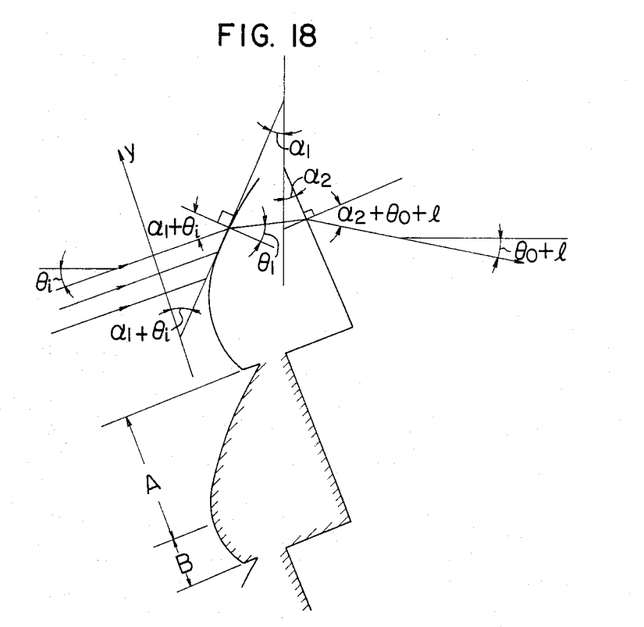
FIG. 18 is an enlarged view showing elementary lens surfaces of the screen shown in FIG. 17.

Next, a procedure for determining the configuration of the surface 24 or 25 shown in FIG. 17 will be described by referring to FIG. 18 which shows two elementary lenses in an enlarged view.

(1) The angle of the macro-divergence of light incident on the input surface of the elementary lens under consideration is represented by $\theta_i$.

(2) The angle of divergence of output or exit light is represented by $\theta_o$, while the angle of lenticular divergence is by l.

From Snell's law, the following expression is valid at the input (entry) interface.

$$\sin(\alpha_1 + \theta_i) = n \sin \theta_1 \tag{14}$$

Further, at the output (exit) interface, the following expression applies from Snell's law.

$$n \sin(\alpha_1 + \alpha_2 - \theta_1) = \sin(\alpha_2 + \theta_o + l) \tag{15}$$

(3) A y-axis is drawn perpendicularly to the input light ray. In consideration of the requirement concerning the directivity, the same expression as (13) applies. Namely, $$B(l) = k \cdot \frac{dy}{d \sin(\theta_o + l)} \tag{16}$$

Accordingly, l(y) can be determined as a function of y in accordance with the above expression.

(4) The angle $\alpha_2$ can be approximately determined by placing l=0 and $\alpha_1=0$ in the expressions (14) and (15). Placing $\alpha_1=0$ in the expression (14) results in $$\sin \theta_i = n \sin \theta_1 \tag{17}$$

On the other hand, placing of l=0 and $\alpha_1=0$ in the expression (15) results in $$n \sin(\alpha_2 - \theta_1) = \sin(\alpha_2 + \theta_o)$$

Both expressions can be combined as follows:

$$n \tan \alpha_2 \cos \theta_1 - n \sin \theta_1 = \tan \alpha_2 \cos \theta_o + \sin \theta_o$$

$$\tan \alpha_2 = \frac{n \sin \theta_1 + \sin \theta_o}{n \cos \theta_1 - \cos \theta_o} \tag{18}$$

Thus, $\alpha_2$ is determined.

(5) Next, $\alpha_1(l)$ is determined.

Elimination of $\theta_1$ from the expressions (14) and (15) results in $$\sin(\alpha_1 + \alpha_2)\sqrt{n^2 - \sin^2(\alpha_1 + \theta_1)} - \cos(\alpha_1 + \alpha_2)\sin(\alpha_1 + \theta_i) = \sin(\alpha_2 + \theta_o + l) \tag{19}$$

Thus, $\alpha_1(l)$ can be determined as a function of l in accordance with the expression (19).

Since l determined as a function of y at the step (3), $\alpha_1$ can be determined as a function of y. Accordingly, the inclination or slope $\tan(\alpha_1 + \theta_i)$ of the combined Fresnel and lenticular lens surface can be determined as a function of y. Since the slope or inclination of the combined Fresnel and lenticular surface is given by df(y)/dy, the configuration f(y) of the combined Fresnel and lenticular lens surface can be determined when $\tan(\alpha_1 + \theta_i)$ is determined as a function of y.

Because of the wall produced by the offset of the discontinuous portion, the angle enlarging procedure may be applied only to the region A.

Figure 19:
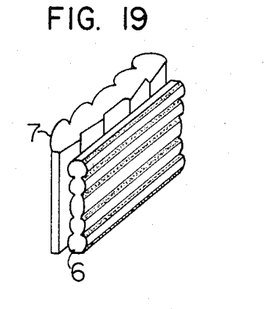
FIG. 19 shows in a perspective view a screen according to a sixth embodiment of the present invention.

FIG. 19 shows a sixth embodiment of the invention, with which the inventive concept incarnated in the aforementioned fifth embodiment is applied to each of the combined Fresnel and lenticular lens surfaces 6 and 7 according to the first embodiment shown in FIG. 6.

The black stripe pattern such as the one 25 shown in FIG. 17 may also be formed on the rear surface of the combined Fresnel and lenticular surface 7, if occasion requires.

In the foregoing description, it has been assumed that the vertical stripes are formed in the light input surface of the screen with the horizontal stripes being formed in the light output surface. However, the invention is never restricted to this arrangement. It goes without saying that the disposition of the vertical stripes and the horizontal stripes may be reversed.

As will be appreciated from the foregoing description, the problem of the moiré interference which has heretofore been considered difficult to be eliminated can be satisfactorily solved in the projection screen according to the present invention by virtue of the provision of the combined or composite Fresnel and lenticular lens surface. Further, since the light diffusing agent for reducing the moiré interference can be spared, the loss of light brought about by the secondary effect of the light diffusing material can be significantly decreased. Thus, it is possible to produce an image in a brightness about 1.5 times as high as the one visible on the hitherto known screen. Besides, by enlarging the angle at both ends of the discontinuous edge in the composite Fresnel and lenticular lens surface, the screen can be manufactured in a much facilitated manner.

I claim:

1. A rear projection screen comprising at least one combined Fresnel and lenticular lens surface which exhibits both Fresnel lens action for macro-converging divergent input light rays and lenticular lens action for micro-diverging said input light rays, said combined Fresnel and lenticular surface including a number of narrow stripes extending in horizontal or vertical direction and forming a recess at each interconnection of stripes with the angle formed at the recess in said combined Fresnel and lenticular surface being enlarged as compared to the angle which would be formed by simple addition of profiles of a Fresnel lens and a lenticular lens.

2. A rear projection screen according to claim 1, wherein each of said stripes comprises a plurality of surface elements parallel to the longitudinal direction of the stripe which are surface elements of said profile formed by simple addition of profiles of a Fresnel lens and a lenticular lens but the order of which is changed.

3. A rear projection screen according to claim 2, wherein each of said stripes has substantially the same orientation at the two edges adjacent to said recesses.

4. A rear projection screen according to claim 2, wherein each of said stripes has such a profile that said profile formed by simple addition of profile of a Fresnel lens and a lenticular lens has been decomposed into a plural number of surface elements parallel to the stripe and the surface elements of the odd number and those of the even number are rearranged from the two sides to the center of the stripe.

5. A rear projection screen, comprising at least a lens surface,
   said lens surface comprising a multiple of parallel lens stripes,
   each lens stripe of said parallel lens stripes comprising a prismed lenticular means,
   said prismed lenticular means comprising a convex lens part and a concave lens part, a prism angle close to a discontinuous joint portion of said prismed lenticular means being smaller than a prism angle at a center portion of said prismed lenticular means.

6. A rear projection screen according to claim 5, wherein said screen comprises a pair of said lens surfaces.

7. A rear projection screen according to claim 6, wherein respective ones of said pair of lens surfaces are formed on the input and output sides of said screen.

8. A rear projection screen according to claim 6, wherein both lens surfaces of said pair of lens surfaces are disposed at the light incident side of said screen.

9. A rear projection screen according to claim 5, wherein a surface of said screen at a side thereof opposite said lens surface is provided with a number of parallel black stripes.

10. A rear projection screen according to claim 9, wherein Fresnel components in the form of setbacks are formed in the surface of said screen opposite said lens surface between said parallel black stripes.

* * * * *